J. E. BRADFORD.
SPIRAL SCREW STAKE.
APPLICATION FILED NOV. 21, 1910.

1,011,729.

Patented Dec. 12, 1911.

Witnesses
L. B. James
O. B. Hopkins

Inventor
J. E. Bradford
by H. B. Willson & Co.
Attorneys

UNITED STATES PATENT OFFICE.

JAMES E. BRADFORD, OF DURHAM, NORTH CAROLINA.

SPIRAL-SCREW STAKE.

1,011,729.  Specification of Letters Patent.  Patented Dec. 12, 1911.

Application filed November 21, 1910. Serial No. 593,583.

*To all whom it may concern:*

Be it known that I, JAMES E. BRADFORD, a citizen of the United States, residing at Durham, in the county of Durham and State of North Carolina, have invented certain new and useful Improvements in Spiral-Screw Stakes; and I do declare the following to be a full, clear, and exact description of the invention, such as will enable others skilled in the art to which it appertains to make and use the same.

This invention relates to improvements in hitching stakes.

One object of the invention is to provide a stake of this character having formed thereon a spiral thread whereby the stake may be screwed into engagement with the ground.

Another object is to provide a hitching stake having arranged thereon a swivel or loosely connected ring by means of which an animal may be tethered to the stake without danger of the hitching or tethering rope or strap becoming twisted or wound upon the stake.

A further object is to provide a stake having a swiveled hitching ring provided with means whereby said ring may be operatively engaged with the stake to serve as a handle for screwing the stake into the ground.

Figure 1:
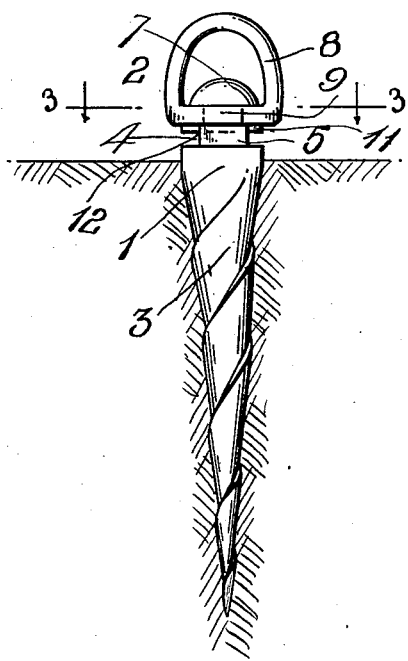
Figure 2:
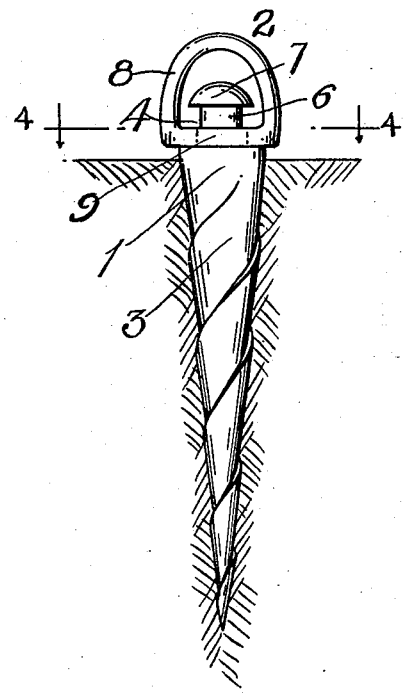
Figure 3:
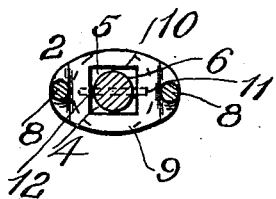
Figure 4:
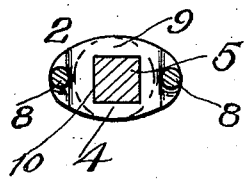

In the accompanying drawings, Figure 1 is a side view of my improved stake showing the swivel ring engaged therewith in operative position to receive the tethering or hitching strap or rope. Fig. 2 is a similar view of the stake showing the swiveled ring in position to serve as a handle for screwing the stake into the ground. Fig. 3 is a horizontal sectional view on the line 3—3 of Fig. 1. Fig. 4 is a similar view on the line 4—4 of Fig. 2.

The body portion of the stake 1 is tapered and has formed thereon a spiral thread 3 and on the upper end of said stake is formed a reduced stem 4, the lower portion of which or the portion adjoining the upper end of the stake is formed angular as shown at 5 while the upper portion of the stem is cylindrical as shown at 6. On the upper end of the stem 4 is formed a head 7.

The hitching member comprises a bail or inverted U-shaped member 8 with which is adapted to be attached the hitching strap, rope or other connection. The free ends of the bail 8 have rigidly secured thereto a flat base plate 9 in which is formed an angular passage or opening 10 which corresponds in size and shape to the angular portion 5 of the stem of the stake.

When the member 2 is dropped or is in its lowermost position resting on the upper end of the stake, the passage 10 will engage the angular portion 5 of the stem and said member will thus serve as a handle for screwing the stake into the ground. When the member 2 is pulled up on the stem into engagement with the head 7 the angular passage 10 will engage the reduced cylindrical portion of the stem thereby permitting the member 2 to revolve freely on the stem. When the stake is in use the member 2 is adapted to be supported in its raised position or in engagement with the cylindrical portion of the stem by means of a supporting pin 11 which is inserted through a transverse passage 12 formed in the angular portion 5 of the stem at the base of the cylindrical portion 6 as clearly shown in Fig. 1 of the drawing. When the member 2 is thus supported in engagement with the cylindrical portion of the stem, said member 2 may be freely revolved in any direction so that a hitching strap or rope connected thereto will not become twisted or wound up on the stake by the movement of the animal tethered thereby.

From the foregoing description taken in connection with the accompanying drawings, the construction and operation of the invention will be readily understood without requiring a more extended explanation of the invention.

Various changes in the form, proportion and minor details of construction may be resorted to without departing from the spirit or sacrificing any of the advantages of the invention as defined in the appended claims.

What is claimed is:

1. A stake of the class described having a stem formed on its upper end, said stem having a lower angular portion and an upper cylindrical portion of less diameter than the angular portion, a head on the upper end of said stem, a hitching member having an angular opening therein, to fit the angular portion of said stem to lock it in engagement with said stem, said opening being larger than said cylindrical portion to permit the swiveled connection of said hitching member with said cylindrical portion, and detachable means for holding said hitching member in engagement with the reduced cylindrical portion of the stem.

2. A hitching stake having a stem or shank formed on its upper end, said shank having an angular lower portion, and a reduced cylindrical upper portion, a head formed on the upper end of said shank, a hitching member having a base plate provided with an angular opening corresponding in shape and size to the angular portion of the shank and adapted to be engaged with said portion to lock the hitching member on the stake and adapted to be engaged with the reduced cylindrical portion of the shank to permit said member to freely revolve on the stake, and means for holding said member in engagement with the reduced cylindrical portion of the stem.

3. A hitching stake having a spiral thread thereon adapted to be screwed into the ground, a shank on the upper end of said stake having an angular lower portion and a reduced cylindrical upper portion, said shank having an aperture extending transversely therethrough at the base of said cylindrical portion, a head on the reduced upper portion of the shank, a hitching member comprising a bail-shaped element having an integrally formed base plate with an angular aperture to engage and fit the angular lower portion of the shank whereby the hitching member is locked to the stake to provide a handle for screwing the stake into the ground, and when the apertured base of said element is in engagement with the reduced cylindrical portion of the shank the member will freely revolve on said cylindrical portion, and a transversely disposed locking pin adapted to be engaged with said shank in position to hold said member in revoluble position.

4. A hitching stake having formed thereon a spiral thread, a shank on the upper end of said stake having an angular lower portion and a reduced cylindrical upper portion, a head on the reduced upper portion of the shank, a hitching member comprising an inverted U-shaped member with a plate rigidly connected to the free ends of the arms thereof and having an angular aperture therein for engagement with the angular lower portion of the shank, and means for holding said plate revolubly engaged with said cylindrical portion of the shank.

In testimony whereof I have hereunto set my hand in presence of two subscribing witnesses.

JAMES E. BRADFORD.

Witnesses:
PAUL WHEELER,
R. C. COX.

---

Copies of this patent may be obtained for five cents each, by addressing the "Commissioner of Patents, Washington, D. C."